US010445738B1

(12) United States Patent
Waters et al.

(10) Patent No.: US 10,445,738 B1
(45) Date of Patent: Oct. 15, 2019

(54) DETECTING A TRANSACTION VOLUME ANOMALY

(71) Applicant: Capital One Services, LLC, McLean, VA (US)

(72) Inventors: Ming Waters, Walkerton, VA (US); Donald J. Gennetten, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/189,841

(22) Filed: Nov. 13, 2018

(51) Int. Cl.
*G06Q 40/00* (2012.01)
*G06Q 20/40* (2012.01)
*G06Q 50/26* (2012.01)
*G06Q 20/42* (2012.01)

(52) U.S. Cl.
CPC ....... *G06Q 20/4016* (2013.01); *G06Q 20/425* (2013.01); *G06Q 50/265* (2013.01)

(58) Field of Classification Search
CPC .... G06Q 40/00; G06Q 20/40; G06Q 20/4016; G06Q 50/265; G06Q 20/425
USPC ................................. 705/35–40, 44
See application file for complete search history.

(56) References Cited

U.S. PATENT DOCUMENTS

| | | | | |
|---|---|---|---|---|
| 7,877,311 B1 * | 1/2011 | Woestemeyer | ........ | G06Q 40/04 705/37 |
| 8,682,812 B1 | 3/2014 | Ranjan | | |
| 2015/0073929 A1 * | 3/2015 | Psota | ..................... | G06Q 50/28 705/26.2 |
| 2016/0379309 A1 * | 12/2016 | Shikhare | ................. | G06Q 10/04 705/4 |
| 2017/0032383 A1 * | 2/2017 | Unser | ................. | G06Q 30/0201 |
| 2017/0213280 A1 * | 7/2017 | Kaznady | .............. | G06Q 40/025 |
| 2018/0337820 A1 * | 11/2018 | Chen | ........................ | H04L 41/08 |
| 2019/0018900 A1 * | 1/2019 | Li | ........................... | G06N 20/00 |

FOREIGN PATENT DOCUMENTS

| | | | | |
|---|---|---|---|---|
| EP | 2571225 A1 * | 3/2013 | ........... | H04L 63/102 |
| KR | 20160119678 | 10/2016 | | |

OTHER PUBLICATIONS

Srivastava et al: "Credit Card Fraud Detection Using Hidden Markov Model", IEEE Transactions on Dependable and Secure Computing, vol. 5, No. 1, Jan.-Mar. 2008 (Year: 2008).*

* cited by examiner

*Primary Examiner* — Edward J Baird
(74) *Attorney, Agent, or Firm* — Harrity & Harrity, LLP

(57) ABSTRACT

A server device obtains historical transaction data regarding transactions involving a network service, obtains historical calendar data regarding static date information for a historical time period that corresponds with the historical transaction data, and processes the historical transaction data and historical calendar data to train a machine learning model using a gradient boosting machine learning technique to predict a normal transaction volume for a period of time and confidence bands associated with the normal transaction volume. The server device generates the normal transaction volume for the period of time and confidence bands using the machine learning model, obtains real-time data concerning a transaction volume during the period of time, detects a transaction volume anomaly based on comparing the real-time data and normal transaction volume and confidence bands, and sends an alert, based on the transaction volume anomaly, to cause a remote device to display the alert and perform an action.

20 Claims, 10 Drawing Sheets

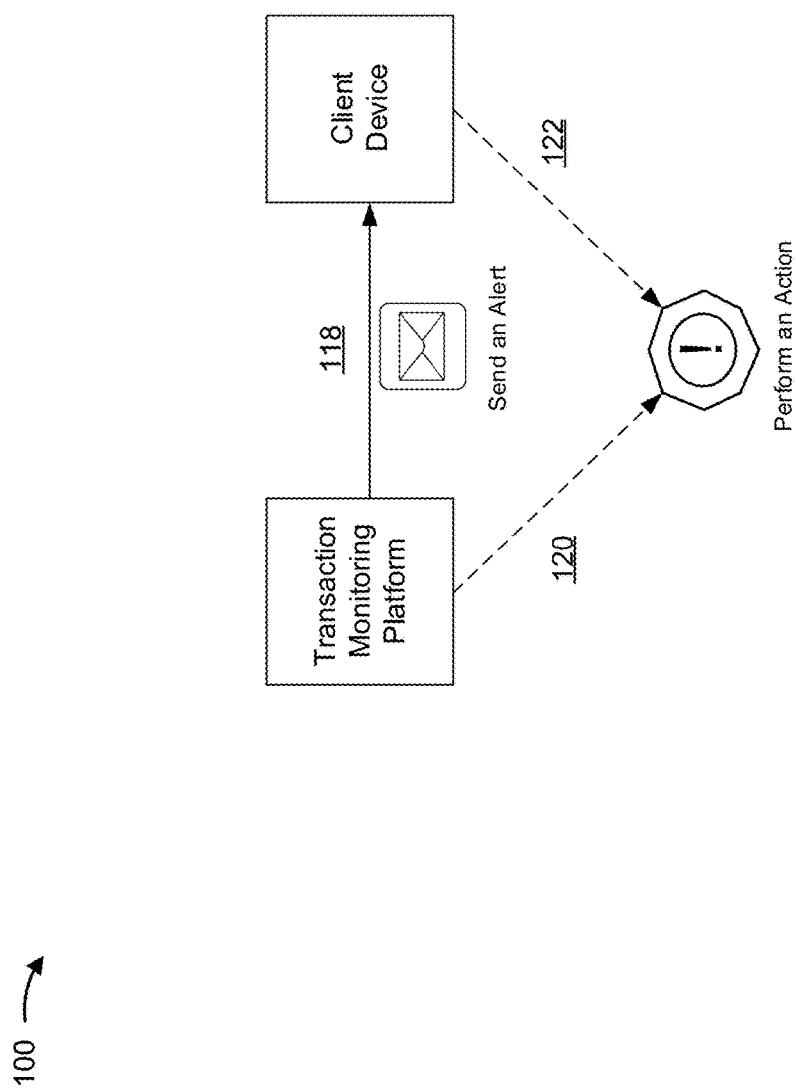

DETECTING A TRANSACTION VOLUME ANOMALY

BACKGROUND

A transaction monitoring platform can track transactions concerning a network service, such as a website, a mobile application, and/or the like. In some cases, the transaction monitoring platform can track a request frequency, an error rate, a load time, and/or the like concerning the network service.

SUMMARY

According to some possible implementations, a server device may include one or more memories, and one or more processors, communicatively coupled to the one or more memories, to obtain historical transaction data regarding a plurality of transactions involving a network service, to obtain historical calendar data regarding static date information for a historical time period that corresponds with the historical transaction data, and to process the historical transaction data and the historical calendar data to train a machine learning model using a gradient boosting machine learning technique to predict a normal transaction volume for a period of time and one or more confidence bands associated with the normal transaction volume. The one or more processors may generate the normal transaction volume for the period of time and the one or more confidence bands using the machine learning model, may obtain real-time data concerning a transaction volume during the period of time, and may detect a transaction volume anomaly based on comparing the real-time data and the normal transaction volume and the one or more confidence bands. The one or more processors may generate an alert based on the transaction volume anomaly, and may send the alert to a remote device to cause the remote device to display the alert and perform an action.

According to some possible implementations, a non-transitory computer-readable medium may store instructions that include one or more instructions that, when executed by one or more processors of a server device, cause the one or more processors to obtain historical transaction data regarding a plurality of transactions involving a network service, to obtain historical calendar data regarding static date information for a historical time period that corresponds with the historical transaction data, and to process the historical transaction data and the historical calendar data using a gradient boosting machine learning technique to train a machine learning model to forecast a normal transaction volume for a period of time and a confidence band associated with the normal transaction volume. The one or more instructions may cause the one or more processors to generate the normal transaction volume for the period of time and the confidence band using the machine learning model, to obtain real-time data concerning a transaction volume for the period of time, and to detect a transaction volume anomaly based on comparing the real-time data and the confidence band. The one or more instructions may cause the one or more processors to generate an alert based on the transaction volume anomaly, to send the real-time data, the normal transaction volume, the confidence band, and the alert to a storage device, and to cause an action to be performed to respond to the transaction volume anomaly.

According to some possible implementations, a method may include obtaining, by a server device, historical transaction data regarding a plurality of transactions involving a network service, wherein the historical transaction data concerns a plurality of transaction types. The method may include obtaining, by the server device, historical calendar data regarding static date information for a historical time period that corresponds with the historical transaction data, and processing, by the server device, the historical transaction data and the historical calendar data using a gradient boosting machine learning technique to train a machine learning model to determine a normal transaction volume range for each transaction type of the plurality of transaction types. The method may include generating, by the server device, the normal transaction volume range for each transaction type of the plurality of transaction types using the machine learning model, obtaining, by the server device, real-time data concerning a transaction volume for each transaction type of the plurality of transaction types, and detecting, by the server device, a transaction volume anomaly concerning a transaction type of the plurality of transaction types based on comparing the real-time data and the normal transaction volume range. The method may include generating, by the server device, an alert based on the transaction volume anomaly, sending, by the server device, the real-time data, the normal transaction volume range, and the alert to a storage device, and causing, by the server device, an action to be performed to respond to the transaction volume anomaly.

BRIEF DESCRIPTION OF THE DRAWINGS

FIGS. 1A-1E are diagrams of example implementations described herein.

DETAILED DESCRIPTION

Figure 1A:
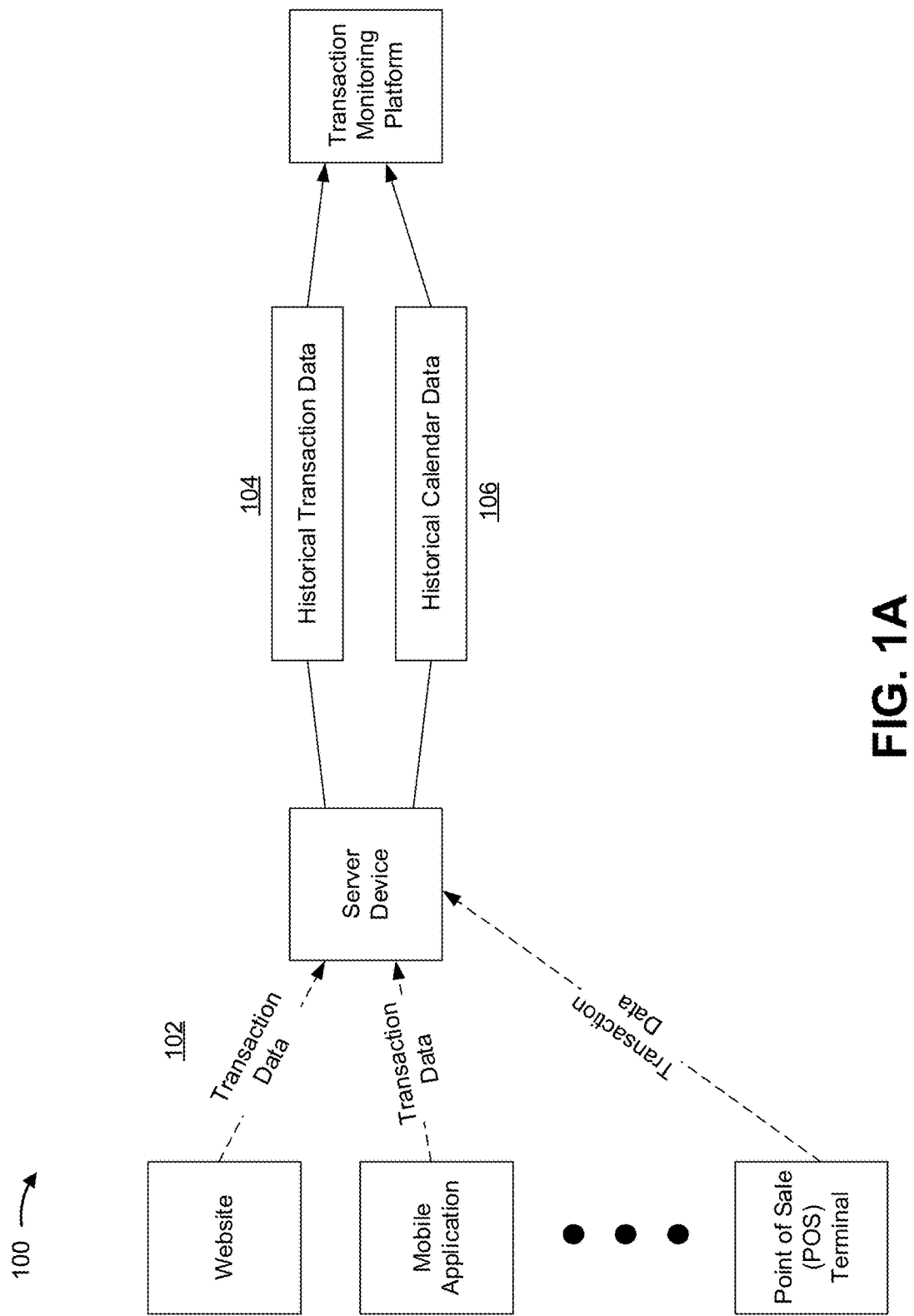

The following detailed description of example implementations refers to the accompanying drawings. The same reference numbers in different drawings may identify the same or similar elements.

A server may track transactions concerning a network service, such as a website, a mobile application, and/or the like. For example, the server may track a request frequency, an error rate, a load time, and/or the like concerning the network service. However, in some cases, customer-facing issues may occur regarding a network service that are not easily tracked by the server. For example, a mobile application may crash upon execution (e.g., before the application can send any information to the server), but the server may not know that this error has occurred. This can lead to meaningful, detrimental impacts on the use of the network service that might go unnoticed by the server.

Some implementations, described herein, provide a transaction monitoring platform that tracks a real-time transaction volume concerning a network service and detects when the real-time transaction volume differs from a predicted normal transaction volume. According to some implementations, the transaction monitoring platform obtains historical transaction data regarding a plurality of transactions involving the network service and historical calendar data that corresponds with the historical transaction data. In some implementations, the transaction monitoring platform processes the historical transaction data and the historical calendar data to train a machine learning model to predict the normal transaction volume and one or more confidence bands for a period of time. According to some implementations, the transaction monitoring platform generates the normal transaction volume and the one or more confidence bands using the machine learning model. In some implementations, the transaction monitoring platform obtains real-time data concerning a transaction volume and compares the real-time data to the normal transaction volume and the one or more confidence bands to detect a transaction anomaly. According to some implementations, the transaction monitoring platform generates an alert based on the transaction volume anomaly and sends the alert to a remote device for display.

In this way, some implementations described herein can alert network resource managers regarding real-time transaction volume issues concerning the network service. For example, the transaction monitoring platform can send an alert that indicates that the real-time transaction volume exceeds the normal transaction volume and the one or more confidence bands, which may indicate a hacking attack (e.g., a distributed denial of service (DDOS) attack, a botnet attack, and/or the like). In this way, some implementations described herein provide network resource managers, as well as automated systems, with information that can be used to change settings and configurations related to the network service. Moreover, tracking transaction volume anomalies may decrease a mean time to detect (MTTD) a network service issue, which would take longer to detect using traditional monitoring functions (e.g., such as receiving communications from customers regarding customer-facing network service errors). Similarly, some implementations described herein can allow the network resource managers, as well as automated systems, to create transaction volume protocols, which can prevent or reduce transaction volume anomalies from reoccurring. This can result in a better user experience for customers utilizing the network service. This can also result in less wear-and-tear on components (e.g., less server throttling) related to providing the network service, which can reduce costs associated with maintaining the network service.

Furthermore, implementations described herein are automated and can capture and process numerous (e.g., hundreds, thousands, millions, billions, and/or the like) data points to predict a normal transaction volume for a period of time and one or more confidence bands associated with the normal transaction volume concerning multiple transaction types (e.g., hundreds, thousands, millions, and/or the like) at the same time. This can improve speed and efficiency of the process and conserve computing resources (e.g., processor resources, memory resources, and/or the like) of the transaction monitoring platform that would otherwise be used to attempt to determine customer-facing issues. Furthermore, implementations described herein use a rigorous, computerized process to perform tasks or roles that were not previously performed or were previously performed using subjective human intuition or input. For example, currently there does not exist a technique to automatically obtain and process historical transaction data and historical calendar data to predict a normal transaction volume for a period of time and one or more confidence bands associated with the normal transaction volume. Finally, implementations described herein conserve computing resources (e.g., processor resources, memory resources, and/or the like) that would otherwise be wasted in attempting to assist a human in obtaining historical transaction data and historical calendar data, predicting a normal transaction volume for a period of time and one or more confidence bands associated with the normal transaction volume, detecting a transaction volume anomaly, and generating an alert by hand.

FIGS. 1A-1E are diagrams of example implementations 100 described herein. As shown in FIG. 1A, example implementation 100 may include a server device (e.g., one or more devices capable of receiving, generating, storing, processing, and/or providing information associated with transactions) and a transaction monitoring platform (e.g., a system that monitors the transactions). Some example implementations described herein concern a single server device and/or a single transaction monitoring platform, but implementations can include a plurality of server devices and/or a plurality of transaction monitoring platforms. In some implementations, the server device and the transaction monitoring platform may be connected via a network, such as the Internet, an intranet, and/or the like.

As shown by reference number 102, the server device may receive transaction data. In some implementations, the server device may receive transaction data concerning a network service associated with, such as, a website, a mobile application, one or more point of sale (POS) terminals, one or more automated teller machines (ATMs), and/or the like. In some implementations, the server device may obtain (e.g., receive, collect, capture, and/or the like) the transaction data. For example, the server device may collect transaction data related to a login transaction, a view account summary transaction, a view recent credit card purchases transaction, a submit credit card payment transaction, a view recent bank events transaction, a view recent auto loan events transaction, and/or the like associated with a banking website. As another example, the server device may capture transaction data related to a login transaction, a view account summary transaction, a view home loans account summary transaction, a submit credit card payment transaction, a submit bank funds transfer transaction, a submit check image for deposit transaction, a view recent credit card purchases transaction, a view credit card statement transaction, a view bank statement list transaction, and/or the like associated with a mobile banking application. As an additional example, the server device may receive transaction data related to a transaction card success transaction (e.g., a transaction card approval transaction and/or the like), a transaction card failure transaction (e.g., a transaction card decline transaction and/or the like), a type of transaction card transaction, and/or the like associated with one or more POS terminals.

As shown by reference number 104, the server device may collect historical transaction data for a historical period of time (e.g., capture and store transaction data from a particular period of time in the past). In some implementations, the historical transaction data may concern a plurality of transactions involving one or more types of transactions concerning one or more network services. In some implementations, the server device may send the historical transaction data to the transaction monitoring platform (e.g., transmit the historical transaction data to the transaction monitoring platform via the network). In some implementations, the transaction monitoring platform may obtain (e.g., receive, collect, capture, and/or the like) the historical transaction data from the server device via the network.

As shown by reference number 106, the server device may collect historical calendar data for the historical period of time (e.g., capture and store calendar data from the historical period of time that corresponds with the historical transaction data). In some implementations, the historical calendar data may concern static date information for the historical period of time. For example, the historical calendar data may comprise one or more day elements, where a day element may include a plurality of time segments (e.g., increments of time, such as five-minute time intervals), date information (e.g., day of the week), holiday information (e.g., a government holiday, a religious holiday, and/or the like), special event information (e.g., natural phenomena information, natural disaster information, weather information, blackout information, boycott information, and/or the like). In some implementations, the server device may send the historical calendar data to the transaction monitoring platform (e.g., transmit the historical calendar data to the transaction monitoring platform via the network). In some implementations, the transaction monitoring platform may obtain (e.g., receive, collect, capture, and/or the like) the historical calendar data from the server device via the network.

Figure 1B:
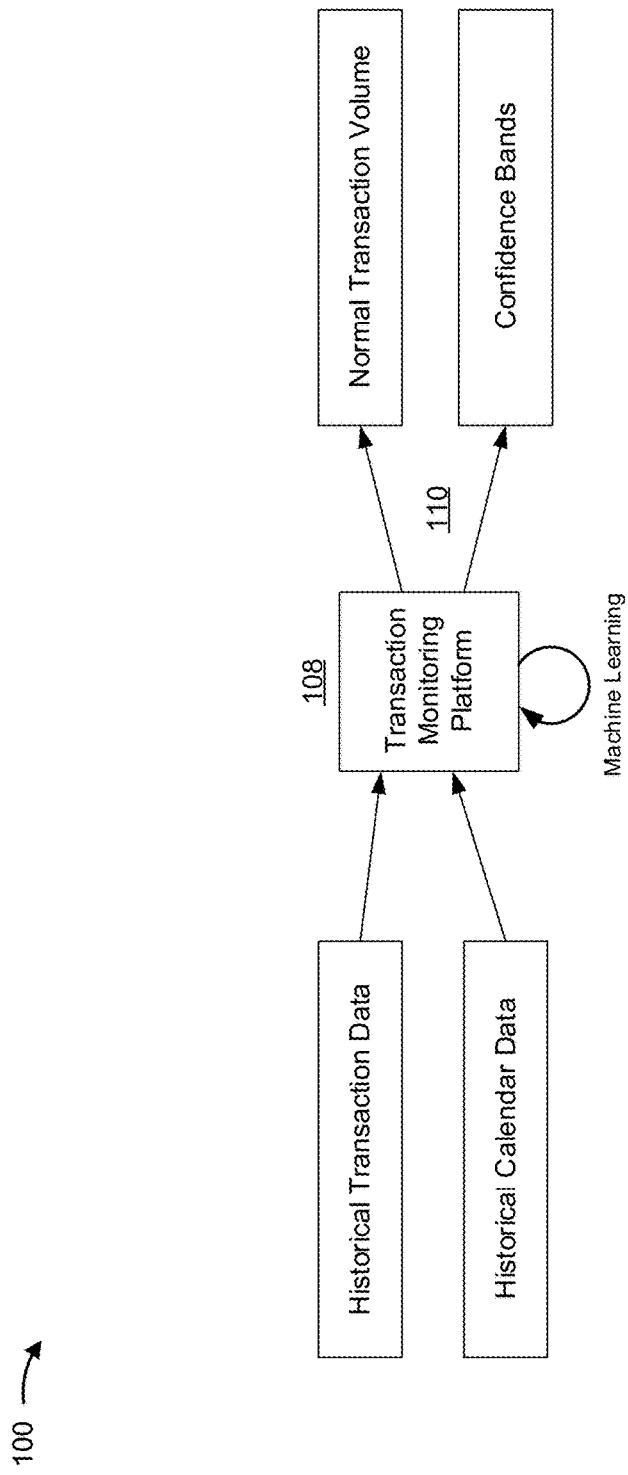

As shown in FIG. 1B, the transaction monitoring platform may process the historical transaction data and/or the historical calendar data. As shown by reference number 108, the transaction monitoring platform may process the historical transaction data and/or the historical calendar data to generate and/or train a machine learning model. In some implementations, the transaction monitoring platform may process the historical transaction data and/or the historical calendar data to train the machine learning model to predict and/or forecast a normal transaction volume for a period of time and/or one or more confidence bands associated with the normal transaction volume (e.g., one or more confidence bands that indicate a standard of deviation, a margin of error, and/or the like from the normal transaction volume). In some implementations, the transaction monitoring platform may process the historical transaction data and/or the historical calendar data to train the machine learning model to determine a normal transaction volume range (e.g., a range of normal transaction volumes with a high likelihood of being correct) for a transaction type of one or more types of transactions.

In some implementations, the transaction monitoring platform may perform a set of data manipulation procedures to process the historical transaction data and/or the historical calendar data to generate the machine learning model, such as a data preprocessing procedure, a model training procedure, a model verification procedure, and/or the like. For example, the transaction monitoring platform may preprocess the historical transaction data and/or the historical calendar data to remove numbers and/or letters, non-ASCII characters, other special characters, white spaces, confidential data, and/or the like. In this way, the transaction monitoring platform may organize thousands, millions, or billions of data entries for machine learning and model generation—a data set that cannot be processed objectively by a human actor.

In some implementations, the transaction monitoring platform may perform a training operation when generating the machine learning model. For example, the transaction monitoring platform may portion the historical transaction data and/or the historical calendar data into a training set, a validation set, a test set, and/or the like. In some implementations, the transaction monitoring platform may train the machine learning model using, for example, an unsupervised training procedure and based on the training set of the data. In some implementations, the transaction monitoring platform may perform dimensionality reduction to reduce the historical transaction data and/or the historical calendar data to a minimum feature set, thereby reducing processing to train the machine learning model, and may apply a classification technique, to the minimum feature set.

In some implementations, the transaction monitoring platform may use a classification technique, such as a logistic regression classification technique, a gradient boosting machine learning technique, and/or the like to determine a categorical outcome (e.g., that particular historical transaction data and/or particular historical calendar data is associated with a particular normal transaction volume, a particular normal transaction volume range, and/or particular confidence bands). Additionally, or alternatively, the transaction monitoring platform may use a naïve Bayesian classifier technique. In this case, the transaction monitoring platform may perform binary recursive partitioning to split the data of the minimum feature set into partitions and/or branches, and use the partitions and/or branches to perform predictions (e.g., that particular historical transaction data and/or particular historical calendar data is associated with a particular normal transaction volume, a particular normal transaction volume range, and/or particular confidence bands). Based on using recursive partitioning, the transaction monitoring platform may reduce utilization of computing resources relative to manual, linear sorting and analysis of data points, thereby enabling use of thousands, millions, or billions of data points to train the machine learning model, which may result in a more accurate machine learning model than using fewer data points.

Additionally, or alternatively, the transaction monitoring platform may use a support vector machine (SVM) classifier technique to generate a non-linear boundary between data points in the training set. In this case, the non-linear boundary is used to classify test data (e.g., particular historical transaction data and/or particular historical calendar data) into a particular class (e.g., a class indicating that the particular historical transaction data and/or the particular historical calendar data is associated with a particular normal transaction volume, a particular normal transaction volume range, and/or particular confidence bands).

Additionally, or alternatively, the transaction monitoring platform may train the machine learning model using a supervised training procedure that includes receiving input to the model from a subject matter expert, which may reduce an amount of time, an amount of processing resources, and/or the like to train the machine learning model relative to an unsupervised training procedure. In some implementations, the transaction monitoring platform may use one or more other model training techniques, such as a neural network technique, a latent semantic indexing technique, and/or the like. For example, the transaction monitoring platform may perform an artificial neural network processing technique (e.g., using a two-layer feedforward neural network architecture, a three-layer feedforward neural network architecture, and/or the like) to perform pattern recognition with regard to patterns of particular historical transaction data and/or particular historical calendar data associated with a particular normal transaction volume, a particular normal transaction volume range, and/or particular confidence bands. In this case, using the artificial neural network processing technique may improve an accuracy of the machine learning model generated by the transaction monitoring platform by being more robust to noisy, imprecise, or incomplete data, and by enabling the transaction monitoring platform to detect patterns and/or trends undetectable to human analysts or systems using less complex techniques.

Accordingly, the transaction monitoring platform may use any number of artificial intelligence techniques, machine learning techniques, deep learning techniques, and/or the like to determine the normal transaction volume, the normal transaction volume range, and/or the one or more confidence bands. Some implementations described herein concern training a machine learning model for a single transaction type based on data concerning a single transaction type, but implementations also include training one or more machine learning models for a plurality of transaction types based on data concerning a plurality of transaction types.

As shown by reference number 110, the transaction monitoring platform may generate the normal transaction volume, the normal transaction volume range, the one or more confidence bands, and/or the like. In some implementations, the transaction monitoring platform may generate the normal transaction volume, the normal transaction volume range, the one or more confidence bands, and/or the like for the period of time using the machine learning model. In some implementations, the transaction monitoring platform may generate the one or more confidence bands based on the normal transaction volume. For example, the transaction monitoring platform may process the normal transaction volume to determine a standard of deviation associated with one or more elements of the normal transaction volume, and generate the one or more confidence bands based on the standard of deviation associated with the one or more elements of the normal transaction volume.

In some implementations, the transaction monitoring platform may determine an upper confidence band and/or a lower confidence band. For example, the upper confidence band may indicate a first transaction volume threshold that is greater than the normal transaction volume and the lower confidence band may indicate a second transaction volume threshold that is less than the normal transaction volume.

Figure 1C:
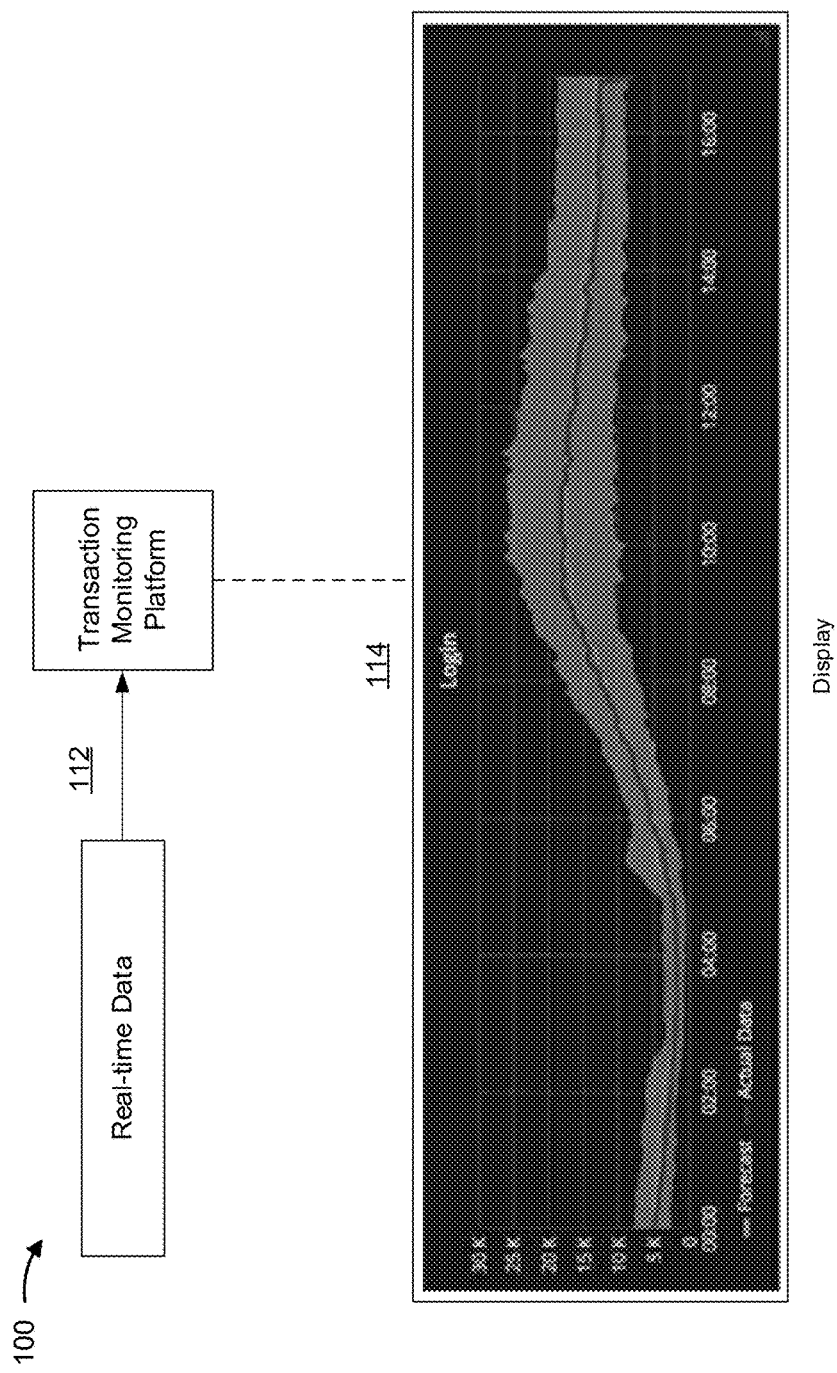

As shown in FIG. 1C, the transaction monitoring platform obtains real-time data. As shown by reference number 112, the transaction monitoring platform may obtain real-time data concerning a transaction volume during the period of time. For example, the server device may obtain the real-time data and send the real-time data to the transaction monitoring platform during the period of time. In some implementations, the transaction monitoring platform may obtain real-time information (e.g., information concerning real-time data for multiple transactions, multiple transaction types, multiple time periods, and/or the like) from one or more server devices. The transaction monitoring platform may process the real-time information to determine the real-time data concerning a transaction volume for a particular transaction type for the period of time. In some implementations, the transaction monitoring platform may obtain real-time data concerning a transaction volume for one or more transaction types of a plurality of transaction types for the period of time.

As shown by reference number 114, the transaction monitoring platform may cause display of the real-time data and/or additional information. In some implementations, the transaction monitoring platform may cause display of display information, such as the real-time data, the normal transaction volume, the normal transaction volume range, the one or more confidences bands, and/or the like for the time period and/or other time periods. In some implementations, the transaction monitoring platform may cause the transaction monitoring platform or another device, such as the server device or a client device, to display the display information. For example, as shown in FIG. 1C, the transaction monitoring platform may send one or more messages to the client device that cause the client device to display the real-time data as a first color, the normal transaction volume as a second color, the normal transaction volume range and/or the area between the one or more confidence bands as a third color, for the time period. In some implementations, the transaction monitoring platform may cause display of the display information for multiple transaction types. For example, the transaction monitoring platform may cause display of the display information concerning the login transactions, the view account summary transactions, the view recent credit card purchases transactions, the submit credit card payment transactions, the view recent bank events transactions, the view recent auto loan events transactions, and/or the like associated with the banking website at the same time.

Figure 1D:
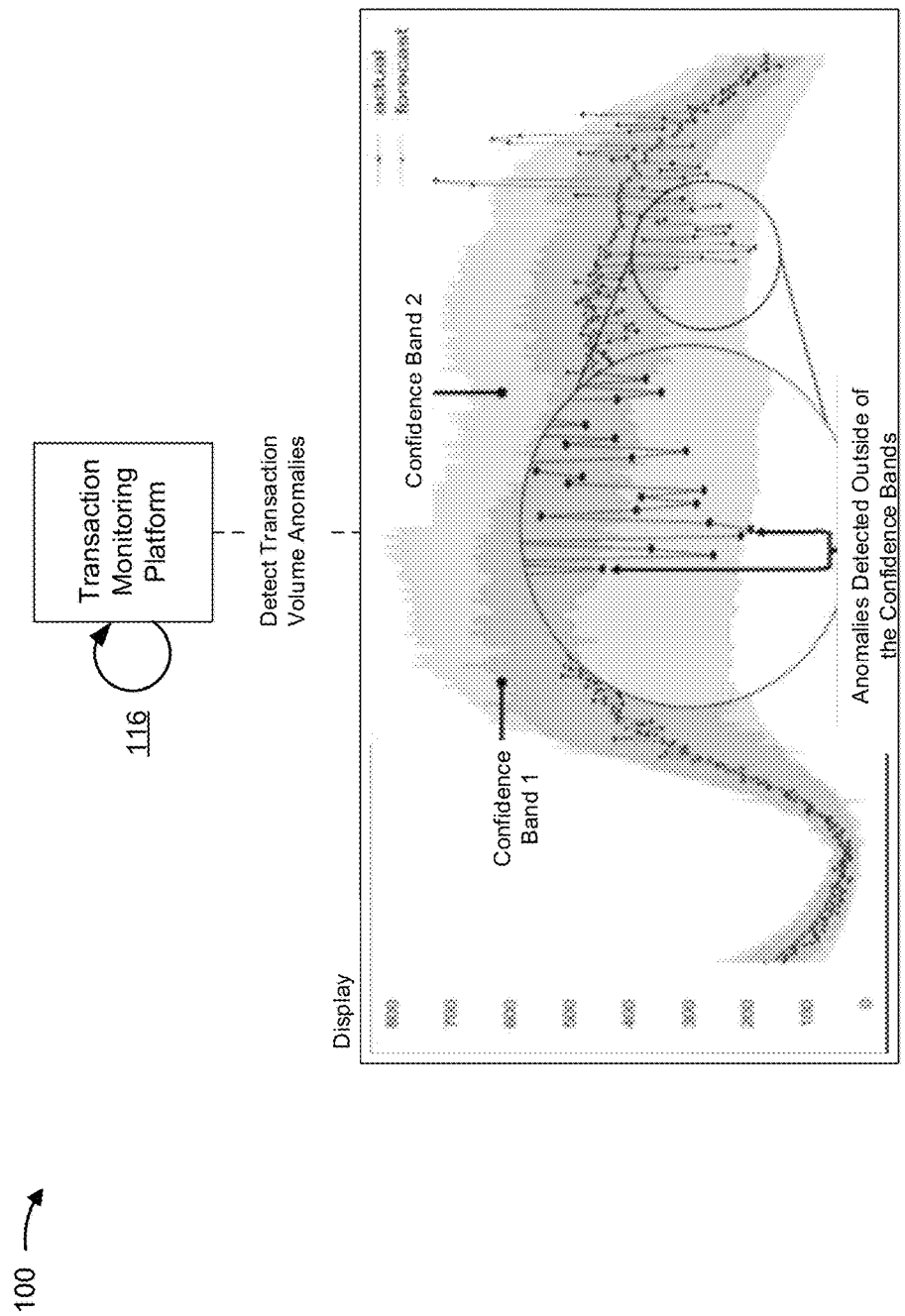

As shown in FIG. 1D and by reference number 116, the transaction monitoring platform detects transaction volume anomalies. In some implementations, the transaction monitoring platform may detect a transaction volume anomaly based on comparing the real-time data and the normal transaction volume and the one or more confidence bands. For example, the transaction monitoring platform may compare the transaction volume associated with the real-time data and the normal transaction volume. If the transaction volume does not match the normal transaction volume (e.g., the transaction volume is not within a standard of deviation away from the normal transaction volume), the transaction monitoring platform may compare the transaction volume and the one or more confidence bands. The transaction monitoring platform may determine that a transaction volume anomaly exists if the transaction volume does not fall within the one or more confidence bands for the period of time. As another example, when detecting the transaction volume anomaly based on comparing the real-time data and the normal transaction volume and the one or more confidence bands, the transaction monitoring platform may determine that the real-time data satisfies the first transaction volume threshold (e.g., the transaction volume is greater than the first transaction volume threshold) or that that the real-time data satisfies the second transaction volume threshold (e.g., the transaction volume is less than the second transaction volume threshold).

As an additional example, the transaction monitoring platform may determine that a transaction volume anomaly exists if a single data point associated with the transaction volume falls outside the normal transaction volume range and/or the one or more confidence bands. As another example, the transaction monitoring platform may determine that a transaction volume anomaly exists if multiple data points associated with the transaction volume (e.g., at least two data points, at least a particular amount of data points that satisfy a threshold, and/or the like) fall outside the normal transaction volume range and/or the one or more confidence bands. As a further example, the transaction monitoring platform may determine that a transaction volume anomaly exists if multiple successive data points associated with the transaction volume (e.g., at least two data points back-to-back, at least a particular amount of data points that satisfy a threshold of successive data points, and/or the like) fall outside the normal transaction volume range and/or the one or more confidence bands. As an additional example, the transaction monitoring platform may determine that a transaction volume anomaly exists if multiple data points associated with the transaction volume (e.g., at least two data points, at least a particular amount of data points that satisfy a threshold, and/or the like) fall outside the normal transaction volume range and/or the one or more confidence bands during a particular period of time.

As shown in FIG. 1E, the transaction monitoring platform may generate an alert based on the transaction volume anomaly. For example, the alert may indicate the transaction volume anomaly, a type of the transaction volume anomaly, a date of the transaction volume anomaly, the period of time, and/or the like. As shown by reference number 118, the transaction monitoring platform may send the alert to a remote device, such as the server device, the client device, and/or the like to cause the remote device to display the alert. For example, sending the alert to the remote device may cause the remote device to display an indicator that indicates that the transaction volume anomaly has occurred.

As shown by reference number 120, the transaction monitoring platform may perform an action based on and/or in response to detecting the transaction volume anomaly and/or generating the alert. For example, the transaction monitoring platform may send the real-time data and the transaction volume anomaly to one or more servers for storage. As another example, the transaction monitoring platform may send the real-time data, the normal transaction volume, the normal transaction volume range, the confidence band, the alert, and/or the like to a storage device. In some implementations, the transaction monitoring platform may perform the action immediately after detecting the transaction volume anomaly and/or generating the alert. In some implementations, the transaction monitoring platform may perform the action at a later time (e.g., on a scheduled basis, at a set hour, at a set day, at a set week, at a set month, and/or the like, on an on-demand basis, during a transaction monitoring platform maintenance period, during a transaction monitoring platform down time, during a machine learning model retraining and/or updating time, and/or the like) after detecting the transaction volume anomaly and/or generating the alert.

Further, in some implementations, the transaction monitoring platform may process the real-time data and the transaction volume anomaly to retrain the machine learning model. In some implementations, the transaction monitoring platform may process the real-time data and the transaction volume anomaly using the gradient boosting machine learning technique to retrain the machine learning model. In some implementations, the transaction monitoring platform may retrain the machine learning model based on information stored by the one or more servers and/or the storage device.

In some implementations, the transaction monitoring platform may determine and/or receive a signal indicating that the transaction volume anomaly is erroneous (e.g., that the transaction volume is normal) based on the real-time data, the normal transaction volume, and the one or more confidence bands. For example, the transaction monitoring platform may determine that the transaction volume falls outside of a first confidence band, but only for a short interval of time, and that the transaction volume anomaly is therefore erroneous, moot, and/or the like. In some implementations, the transaction monitoring platform may determine a first time associated with detecting the transaction volume anomaly and a second time associated with determining that the transaction volume anomaly is erroneous (e.g., the transaction volume is normal), and discard the real-time data associated with a time period between the first time and the second time. The transaction monitoring platform then may update the machine learning model based on the real-time data that was not discarded. In this way, the transaction monitoring platform ensures that erroneous or suspect data is not used to update the machine learning model.

In some implementations, the transaction monitoring platform may perform a first responsive action, such as cause a code rollback action (e.g., rollback software to a prior version not associated with transaction volume anomalies) to be performed, cause a server reset action (e.g., reboot a poorly operating server) to be performed, cause a server optimization action (e.g., rebalance overworked servers) to be performed, cause a server recovery action (e.g., recover a server infected by a virus and/or subject to a hacking attack) to be performed, cause a server logging action (e.g., log all operations and/or functions of a server for a particular period of time) to be performed, and/or the like. For example, the transaction monitoring platform may send one or more signals to the server device(s) to perform the first responsive action.

As shown by reference number 122, the transaction monitoring platform may cause the remote device to perform an action by sending the alert to the remote device. In some implementations, the remote device may perform a second responsive action in response to receiving the alert, such as perform the code rollback action, perform the server reset action, perform the server optimization action, perform the server recovery action, perform the server logging action, and/or the like. For example, the remote device may perform the second responsive action on the remote device and/or send one or more signals to the server device(s) to perform the second responsive action.

As indicated above, FIGS. 1A-1E are provided merely as examples. Other examples are possible and may differ from what was described with regard to FIGS. 1A-1E.

Figure 2:
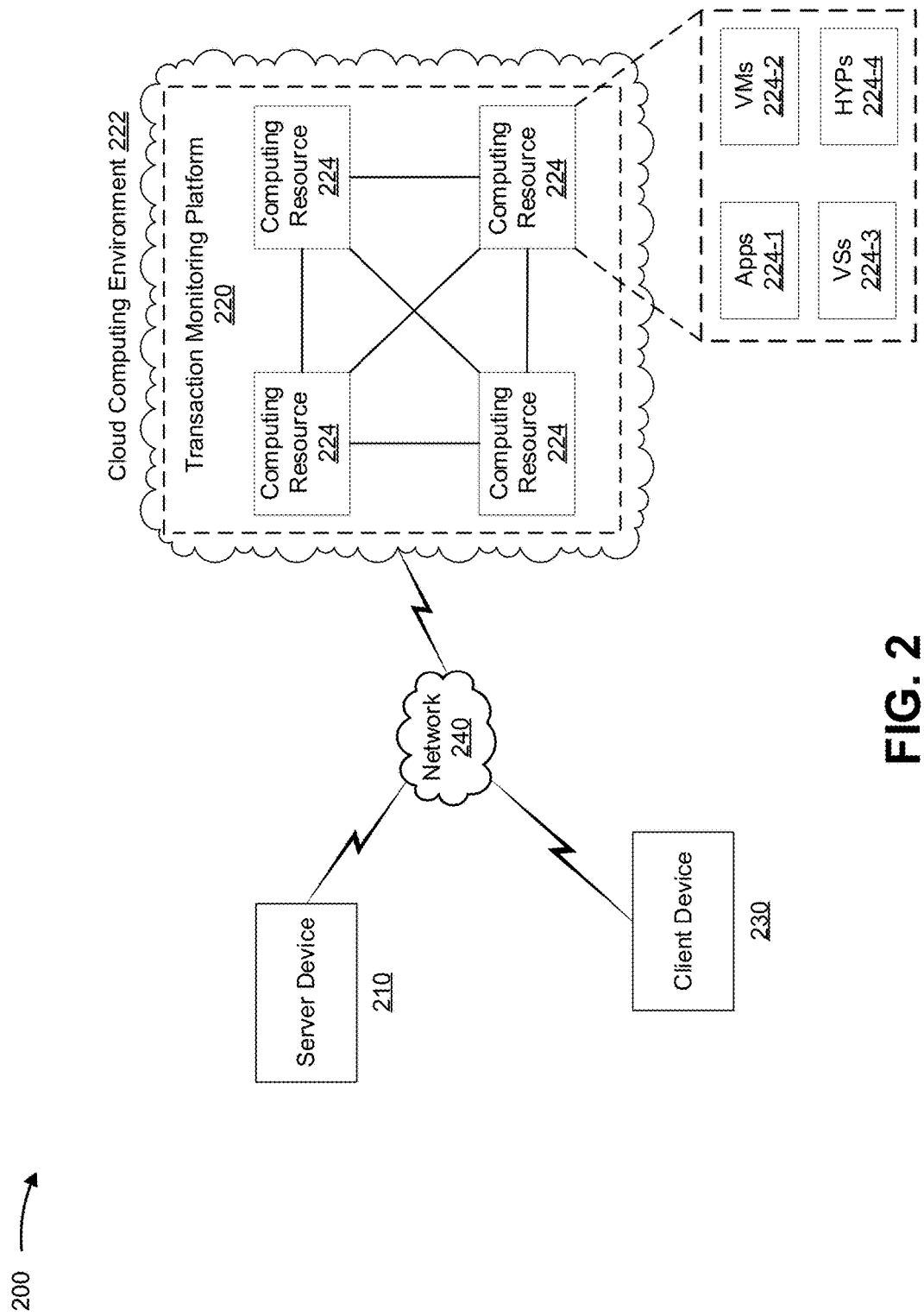
FIG. 2 is a diagram of an example environment in which systems and/or methods, described herein, may be implemented.

FIG. 2 is a diagram of an example environment 200 in which systems and/or methods, described herein, can be implemented. As shown in FIG. 2, environment 200 can include a server device 210, a transaction monitoring platform 220, a computing resource 224, a client device 230, and a network 240. Devices of environment 200 can interconnect via wired connections, wireless connections, or a combination of wired and wireless connections.

Server device 210 includes one or more devices capable of receiving, storing, providing, generating, and/or processing information associated with detecting a transaction volume anomaly. For example, server device 210 may include a server device (e.g., a host server, a web server, an application server, etc.), a data center device, or a similar device. In some implementations, server device 210 may be capable of communicating with client device 230 and/or transaction monitoring platform 220, in a manner designed to facilitate collection of historical transaction data and/or historical calendar data. For example, server device 210 may receive, obtain and/or capture transaction data, may collect historical transaction data for a historical period of time, and/or may send the historical transaction data to transaction monitoring platform 220.

Transaction monitoring platform 220 includes one or more devices that receive and/or process information (e.g., historical transaction data and/or historical calendar data), generate information (e.g., a normal transaction volume, a normal transaction volume range, one or more confidence bands, and/or the like), obtain information (e.g., real-time data concerning a transaction volume during the period of time), and cause display of the real-time data and/or additional information. In some implementations, transaction monitoring platform 220 may detect transaction volume anomalies, generate an alert, send the alert to a remote device (e.g., client device 230, server device 210, and/or the like) to cause the remote device to display the alert, perform an action based on and/or in response to detecting the transaction volume anomaly and/or generating the alert, and/or the like.

In some implementations, transaction monitoring platform 220 can be designed to be modular such that certain software components can be swapped in or out depending on a particular need. As such, transaction monitoring platform 220 can be easily and/or quickly reconfigured for different uses. In some implementations, transaction monitoring platform 220 can receive information from and/or transmit information to server device 210, client device 230, and/or the like.

In some implementations, as shown, transaction monitoring platform 220 can be hosted in a cloud computing environment 222. Notably, while implementations described herein describe transaction monitoring platform 220 as being hosted in cloud computing environment 222, in some implementations, transaction monitoring platform 220 cannot be cloud-based (i.e., can be implemented outside of a cloud computing environment) or can be partially cloud-based.

Cloud computing environment 222 includes an environment that hosts transaction monitoring platform 220. Cloud computing environment 222 can provide computation, software, data access, storage, etc. services that do not require end-user knowledge of a physical location and configuration of system(s) and/or device(s) that hosts transaction monitoring platform 220. As shown, cloud computing environment 222 can include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 can host transaction monitoring platform 220. The cloud resources can include compute instances executing in computing resource 224, storage devices provided in computing resource 224, data transfer devices provided by computing resource 224, etc. In some implementations, computing resource 224 can communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that can be provided to or accessed by client device 230. Application 224-1 can eliminate a need to install and execute the software applications on client device 230. For example, application 224-1 can include software associated with transaction monitoring platform 220 and/or any other software capable of being provided via cloud computing environment 222. In some implementations, one application 224-1 can send/receive information to/from one or more other applications 224-1, via virtual machine 224-2.

Virtual machine 224-2 includes a software implementation of a machine (e.g., a computer) that executes programs like a physical machine. Virtual machine 224-2 can be either a system virtual machine or a process virtual machine, depending upon use and degree of correspondence to any real machine by virtual machine 224-2. A system virtual machine can provide a complete system platform that supports execution of a complete operating system ("OS"). A process virtual machine can execute a single program, and can support a single process. In some implementations, virtual machine 224-2 can execute on behalf of a user (e.g., a user of client device 230 or an operator of transaction monitoring platform 220), and can manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 224-4 can provide hardware virtualization techniques that allow multiple operating systems (e.g., "guest operating systems") to execute concurrently on a host computer, such as computing resource 224. Hypervisor 224-4 can present a virtual operating platform to the guest operating systems, and can manage the execution of the guest operating systems. Multiple instances of a variety of operating systems can share virtualized hardware resources.

Client device 230 includes one or more devices capable of receiving, generating, storing, processing, and/or providing information associated with real-time data concerning a transaction volume. For example, client device 230 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Network 240 includes one or more wired and/or wireless networks. For example, network 240 can include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
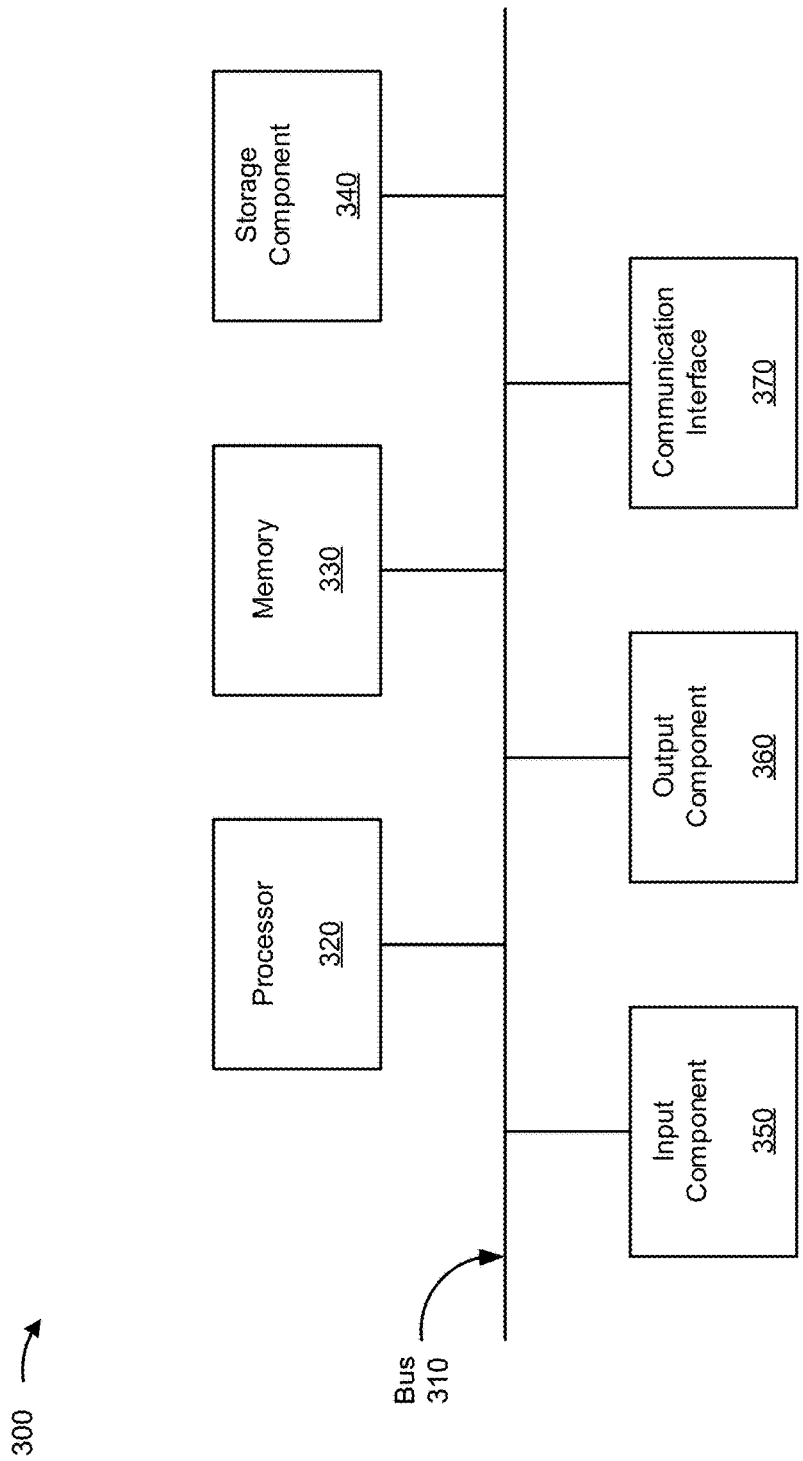
FIG. 3 is a diagram of example components of one or more devices of FIG. 2.

FIG. 3 is a diagram of example components of a device 300. Device 300 may correspond to server device 210, transaction monitoring platform 220, computing resource 224, and/or client device 230. In some implementations, server device 210, transaction monitoring platform 220, computing resource 224, and/or client device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
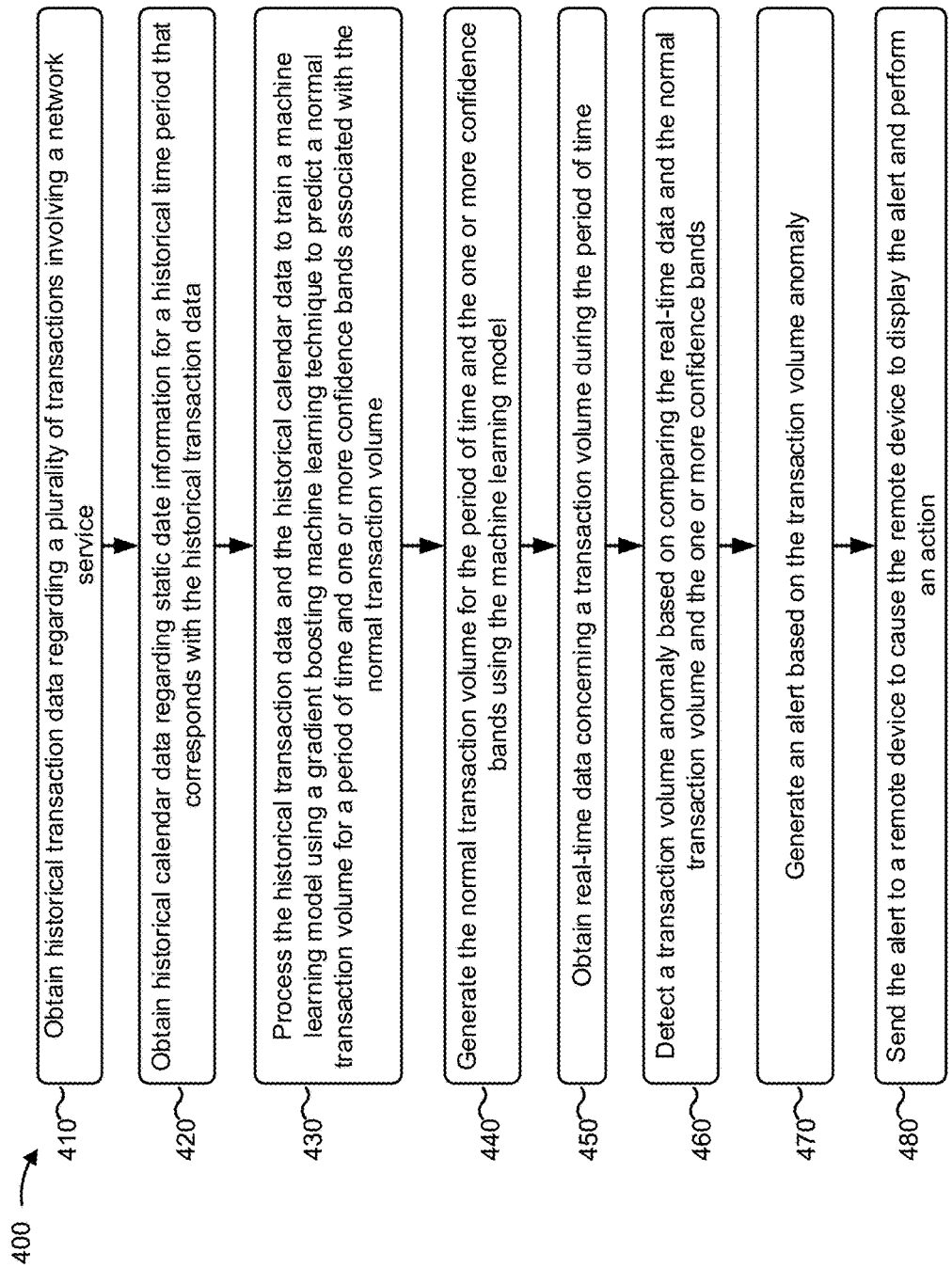
FIG. 4 is a flow chart of an example process for detecting a transaction volume anomaly.

FIG. 4 is a flow chart of an example process 400 for detecting a transaction volume anomaly. In some implementations, one or more process blocks of FIG. 4 may be performed by a transaction monitoring platform (e.g., transaction monitoring platform 220). In some implementations, one or more process blocks of FIG. 4 may be performed by another device or a group of devices separate from or including the transaction monitoring platform, such as a server device (e.g., server device 210), a client device (e.g., client device 230), and/or the like.

As shown in FIG. 4, process 400 may include obtaining historical transaction data regarding a plurality of transactions involving a network service (block 410). For example, the transaction monitoring platform (e.g., using computing resource 224, processor 320, memory 330, storage component 340, input component 350, communication interface 370, and/or the like) may obtain historical transaction data regarding a plurality of transactions involving a network service, as described above in connection with FIGS. 1A-1E.

As further shown in FIG. 4, process 400 may include obtaining historical calendar data regarding static date information for a historical time period that corresponds with the historical transaction data (block 420). For example, the transaction monitoring platform (e.g., using computing resource 224, processor 320, memory 330, storage component 340, input component 350, communication interface 370, and/or the like) may obtain historical calendar data regarding static date information for a historical time period that corresponds with the historical transaction data, as described above in connection with FIGS. 1A-1E.

As further shown in FIG. 4, process 400 may include processing the historical transaction data and the historical calendar data to train a machine learning model using a gradient boosting machine learning technique to predict a normal transaction volume for a period of time and one or more confidence bands associated with the normal transaction volume (block 430). For example, the transaction monitoring platform (e.g., using computing resource 224, processor 320, memory 330, storage component 340, and/or the like) may process the historical transaction data and the historical calendar data to train a machine learning model using a gradient boosting machine learning technique to predict a normal transaction volume for a period of time and one or more confidence bands associated with the normal transaction volume, as described above in connection with FIGS. 1A-1E.

As further shown in FIG. 4, process 400 may include generating the normal transaction volume for the period of time and the one or more confidence bands using the machine learning model (block 440). For example, the transaction monitoring platform (e.g., using computing resource 224, processor 320, memory 330, storage component 340, and/or the like) may generate the normal transaction volume for the period of time and the one or more confidence bands using the machine learning model, as described above in connection with FIGS. 1A-1E.

As further shown in FIG. 4, process 400 may include obtaining real-time data concerning a transaction volume during the period of time (block 450). For example, the transaction monitoring platform (e.g., using computing resource 224, processor 320, memory 330, storage component 340, input component 350, communication interface 370, and/or the like) may obtain real-time data concerning a transaction volume during the period of time, as described above in connection with FIGS. 1A-1E.

As further shown in FIG. 4, process 400 may include detecting a transaction volume anomaly based on comparing the real-time data and the normal transaction volume and the one or more confidence bands (block 460). For example, the transaction monitoring platform (e.g., using computing resource 224, processor 320, memory 330, storage component 340, input component 350, communication interface 370, and/or the like) may detect a transaction volume anomaly based on comparing the real-time data and the normal transaction volume and the one or more confidence bands, as described above in connection with FIGS. 1A-1E.

As further shown in FIG. 4, process 400 may include generating an alert based on the transaction volume anomaly (block 470). For example, the transaction monitoring platform (e.g., using computing resource 224, processor 320, memory 330, storage component 340, and/or the like) may generate an alert based on the transaction volume anomaly, as described above in connection with FIGS. 1A-1E.

As further shown in FIG. 4, process 400 may include sending the alert to a remote device to cause the remote device to display the alert and perform an action (block 480). For example, the transaction monitoring platform (e.g., using computing resource 224, processor 320, memory 330, storage component 340, output component 360, communication interface 370, and/or the like) may send the alert to a remote device to cause the remote device to display the alert and perform an action, as described above in connection with FIGS. 1A-1E.

Process 400 may include additional implementations, such as any single implementation or any combination of implementations described below and/or in connection with one or more other processes described elsewhere herein.

In some implementations, when generating the normal transaction volume for the period of time and the one or more confidence bands using the machine learning model, the transaction monitoring platform may determine the normal transaction volume using the machine learning model, may determine an upper confidence band using the machine learning model, where the upper confidence band indicates a first transaction volume threshold that is greater than the normal transaction volume, and may determine a lower confidence band using the machine learning model, where the lower confidence band indicates a second transaction volume threshold that is less than the normal transaction volume.

In some implementations, when detecting the transaction volume anomaly based on comparing the real-time data and the normal transaction volume and the one or more confidence bands, the transaction monitoring platform may determine that the real-time data satisfies the first transaction volume threshold, or may determine that the real-time data satisfies the second transaction volume threshold. In some implementations, when detecting the transaction volume anomaly based on comparing the real-time data and the normal transaction volume, and the one or more confidence bands, the transaction monitoring platform may determine that a difference between the transaction volume and the normal transaction volume satisfies a threshold associated with the one or more confidence bands.

In some implementations, the transaction monitoring platform may process the real-time data and the transaction volume anomaly to retrain the machine learning model. In some implementations, the transaction monitoring platform may send the real-time data and the transaction volume anomaly to one or more servers for storage, and may retrain the machine learning model based on information stored by the one or more servers. In some implementations, the action may include a code rollback action, a server reset action, a server optimization action, a server recovery action, or a server logging action. In some implementations, the transaction monitoring platform may cause the remote device to display the real-time data, the normal transaction volume, and the one or more confidence bands.

In some implementations, the transaction monitoring platform may determine, after detecting the transaction volume anomaly, that the transaction volume is normal based on the real-time data, the normal transaction volume, and the one or more confidence bands, may determine a first time associated with detecting the transaction volume anomaly, may determine a second time associated with determining that the transaction volume is normal, may discard the real-time data associated with a time period between the first time and the second time, and may update the machine learning model based on the real-time data that was not discarded.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
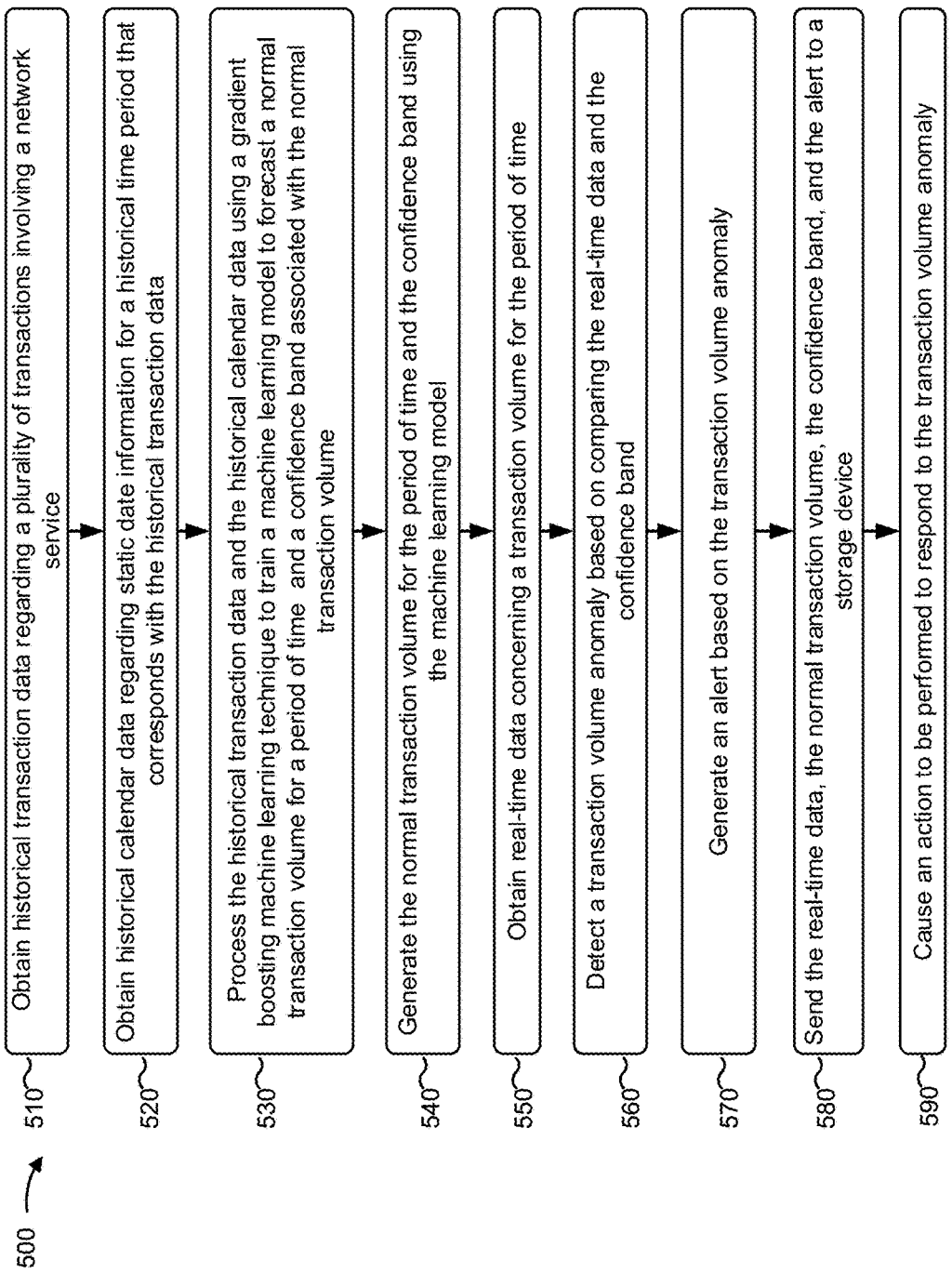
FIG. 5 is a flow chart of an example process for detecting a transaction volume anomaly.

FIG. 5 is a flow chart of an example process 500 for detecting a transaction volume anomaly. In some implementations, one or more process blocks of FIG. 5 may be performed by a transaction monitoring platform (e.g., transaction monitoring platform 220). In some implementations, one or more process blocks of FIG. 5 may be performed by another device or a group of devices separate from or including the transaction monitoring platform, such as a server device (e.g., server device 210), a client device (e.g., client device 230), and/or the like.

As shown in FIG. 5, process 500 may include obtaining historical transaction data regarding a plurality of transactions involving a network service (block 510). For example, the transaction monitoring platform (e.g., using computing resource 224, processor 320, memory 330, storage component 340, input component 350, communication interface 370, and/or the like) may obtain historical transaction data regarding a plurality of transactions involving a network service, as described above in connection with FIGS. 1A-1E.

As further shown in FIG. 5, process 500 may include obtaining historical calendar data regarding static date information for a historical time period that corresponds with the historical transaction data (block 520). For example, the transaction monitoring platform (e.g., using computing resource 224, processor 320, memory 330, storage component 340, input component 350, communication interface 370, and/or the like) may obtain historical calendar data regarding static date information for a historical time period that corresponds with the historical transaction data, as described above in connection with FIGS. 1A-1E.

As further shown in FIG. 5, process 500 may include processing the historical transaction data and the historical calendar data using a gradient boosting machine learning technique to train a machine learning model to forecast a normal transaction volume for a period of time and a confidence band associated with the normal transaction volume (block 530). For example, the transaction monitoring platform (e.g., using computing resource 224, processor 320, memory 330, storage component 340, input component 350, communication interface 370, and/or the like) may process the historical transaction data and the historical calendar data using a gradient boosting machine learning technique to train a machine learning model to forecast a normal transaction volume for a period of time and a confidence band associated with the normal transaction volume, as described above in connection with FIGS. 1A-1E.

As further shown in FIG. 5, process 500 may include generating the normal transaction volume for the period of time and the confidence band using the machine learning model (block 540). For example, the transaction monitoring platform (e.g., using computing resource 224, processor 320, memory 330, storage component 340, and/or the like) may generate the normal transaction volume for the period of time and the confidence band using the machine learning model, as described above in connection with FIGS. 1A-1E.

As further shown in FIG. 5, process 500 may include obtaining real-time data concerning a transaction volume for the period of time (block 550). For example, the transaction monitoring platform (e.g., using computing resource 224, processor 320, memory 330, storage component 340, input component 350, communication interface 370, and/or the like) may obtain real-time data concerning a transaction volume for the period of time, as described above in connection with FIGS. 1A-1E.

As further shown in FIG. 5, process 500 may include detecting a transaction volume anomaly based on comparing the real-time data and the confidence band (block 560). For example, the transaction monitoring platform (e.g., using computing resource 224, processor 320, memory 330, storage component 340, and/or the like) may detect a transaction volume anomaly based on comparing the real-time data and the confidence band, as described above in connection with FIGS. 1A-1E.

As further shown in FIG. 5, process 500 may include generating an alert based on the transaction volume anomaly (block 570). For example, the transaction monitoring platform (e.g., using computing resource 224, processor 320, memory 330, storage component 340, and/or the like) may generate an alert based on the transaction volume anomaly, as described above in connection with FIGS. 1A-1E.

As further shown in FIG. 5, process 500 may include sending the real-time data, the normal transaction volume, the confidence band, and the alert to a storage device (block 580). For example, the transaction monitoring platform (e.g., using computing resource 224, processor 320, memory 330, storage component 340, output component 360, communication interface 370, and/or the like) may send the real-time data, the normal transaction volume, the confidence band, and the alert to a storage device, as described above in connection with FIGS. 1A-1E.

As further shown in FIG. 5, process 500 may include causing an action to be performed to respond to the transaction volume anomaly (block 590). For example, the transaction monitoring platform (e.g., using computing resource 224, processor 320, memory 330, storage component 340, input component 350, output component 360, communication interface 370, and/or the like) may cause an action to be performed to respond to the transaction volume anomaly, as described above in connection with FIGS. 1A-1E.

Process 500 may include additional implementations, such as any single implementation or any combination of implementations described below and/or in connection with one or more other processes described elsewhere herein.

In some implementations, the transaction monitoring platform may process the real-time data and the transaction volume anomaly using the gradient boosting machine learning technique to retrain the machine learning model. In some implementations, when obtaining the real-time data concerning the transaction volume, the transaction monitoring platform may obtain real-time information from a plurality of server devices, and may process the real-time information to determine the real-time data for the period of time. In some implementations, when detecting the transaction volume anomaly based on comparing the real-time data and the confidence band, the transaction monitoring platform may determine that the real-time data is outside of the confidence band for the period of time.

In some implementations, the alert may indicate the transaction volume anomaly, a type of the transaction volume anomaly, a date of the transaction volume anomaly, and the period of time. In some implementations, when causing the action to be performed to respond to the transaction volume anomaly, the transaction monitoring platform may perform a code rollback action, may perform a server reset action, may perform a server optimization action, may perform a server recovery action, or may perform a server logging action.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
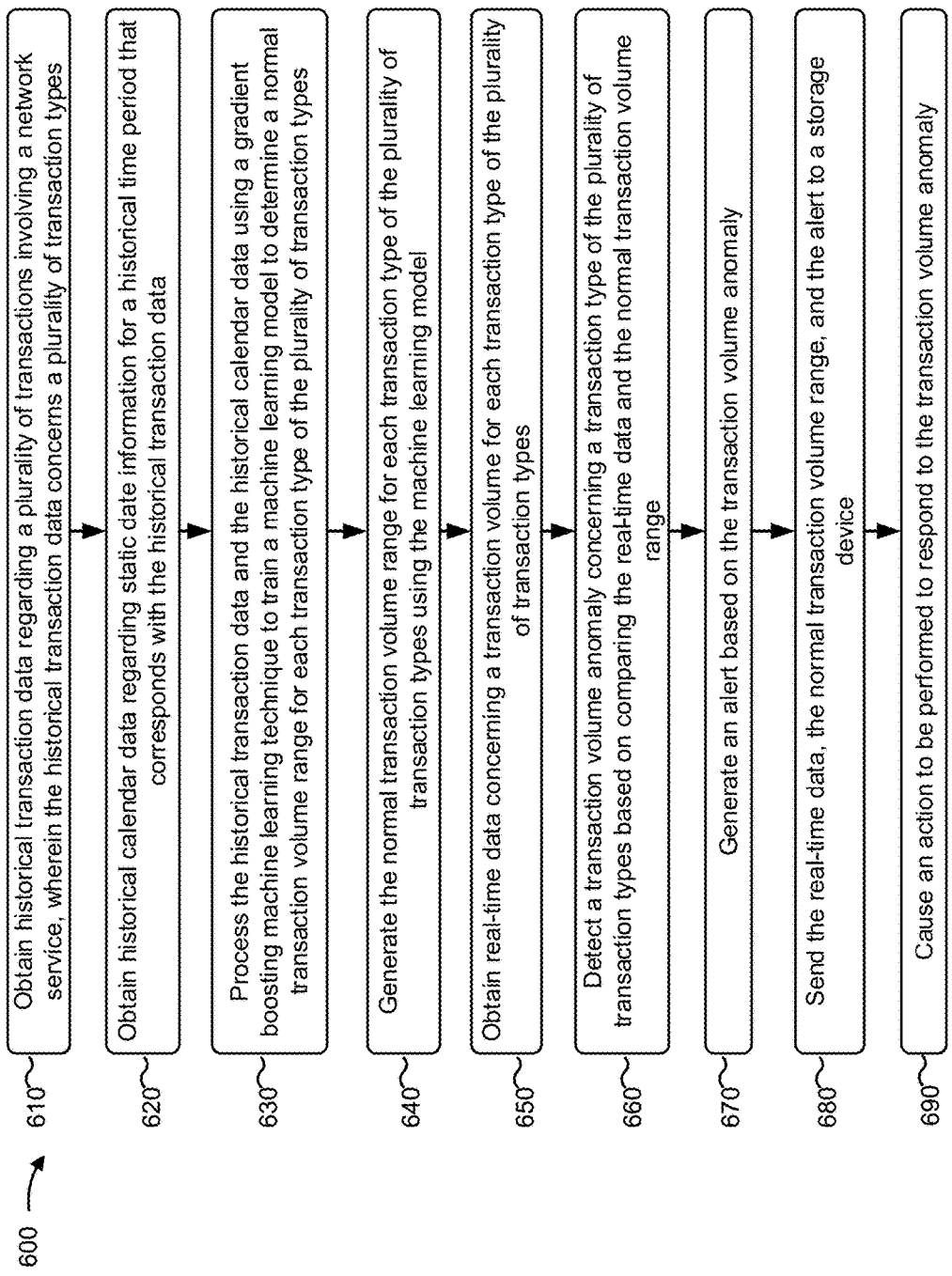
FIG. 6 is a flow chart of an example process for detecting a transaction volume anomaly.

FIG. 6 is a flow chart of an example process 600 for detecting a transaction volume anomaly. In some implementations, one or more process blocks of FIG. 6 may be performed by a transaction monitoring platform (e.g., transaction monitoring platform 220). In some implementations, one or more process blocks of FIG. 6 may be performed by another device or a group of devices separate from or including the transaction monitoring platform, such as a server device (e.g., server device 210), a client device (e.g., client device 230), and/or the like.

As shown in FIG. 6, process 600 may include obtaining historical transaction data regarding a plurality of transactions involving a network service, wherein the historical transaction data concerns a plurality of transaction types (block 610). For example, the transaction monitoring platform (e.g., using computing resource 224, processor 320, memory 330, storage component 340, input component 350, communication interface 370, and/or the like) may obtain historical transaction data regarding a plurality of transactions involving a network service, as described above in connection with FIGS. 1A-1E. In some implementations, the historical transaction data may concern a plurality of transaction types.

As further shown in FIG. 6, process 600 may include obtaining historical calendar data regarding static date information for a historical time period that corresponds with the historical transaction data (block 620). For example, the transaction monitoring platform (e.g., using computing resource 224, processor 320, memory 330, storage component 340, input component 350, communication interface 370, and/or the like) may obtain historical calendar data regarding static date information for a historical time period that corresponds with the historical transaction data, as described above in connection with FIGS. 1A-1E.

As further shown in FIG. 6, process 600 may include processing the historical transaction data and the historical calendar data using a gradient boosting machine learning technique to train a machine learning model to determine a normal transaction volume range for each transaction type of the plurality of transaction types (block 630). For example, the transaction monitoring platform (e.g., using computing resource 224, processor 320, memory 330, storage component 340, and/or the like) may process the historical transaction data and the historical calendar data using a gradient boosting machine learning technique to train a machine learning model to determine a normal transaction volume range for each transaction type of the plurality of transaction types, as described above in connection with FIGS. 1A-1E.

As further shown in FIG. 6, process 600 may include generating the normal transaction volume range for each transaction type of the plurality of transaction types using the machine learning model (block 640). For example, the transaction monitoring platform (e.g., using computing resource 224, processor 320, memory 330, storage component 340, and/or the like) may generate the normal transaction volume range for each transaction type of the plurality of transaction types using the machine learning model, as described above in connection with FIGS. 1A-1E.

As further shown in FIG. 6, process 600 may include obtaining real-time data concerning a transaction volume for each transaction type of the plurality of transaction types (block 650). For example, the transaction monitoring platform (e.g., using computing resource 224, processor 320, memory 330, storage component 340, input component 350, communication interface 370, and/or the like) may obtain real-time data concerning a transaction volume for each transaction type of the plurality of transaction types, as described above in connection with FIGS. 1A-1E.

As further shown in FIG. 6, process 600 may include detecting a transaction volume anomaly concerning a transaction type of the plurality of transaction types based on comparing the real-time data and the normal transaction volume range (block 660). For example, the transaction monitoring platform (e.g., using computing resource 224, processor 320, memory 330, storage component 340, and/or the like) may detect a transaction volume anomaly concerning a transaction type of the plurality of transaction types based on comparing the real-time data and the normal transaction volume range, as described above in connection with FIGS. 1A-1E.

As further shown in FIG. 6, process 600 may include generating an alert based on the transaction volume anomaly (block 670). For example, the transaction monitoring platform (e.g., using computing resource 224, processor 320, memory 330, storage component 340, and/or the like) may generate an alert based on the transaction volume anomaly, as described above in connection with FIGS. 1A-1E.

As further shown in FIG. 6, process 600 may include sending the real-time data, the normal transaction volume range, and the alert to a storage device (block 680). For example, the transaction monitoring platform (e.g., using computing resource 224, processor 320, memory 330, storage component 340, output component 360, communication interface 370, and/or the like) may send the real-time data, the normal transaction volume range, and the alert to a storage device, as described above in connection with FIGS. 1A-1E.

As further shown in FIG. 6, process 600 may include causing an action to be performed to respond to the transaction volume anomaly (block 690). For example, the transaction monitoring platform (e.g., using computing resource 224, processor 320, memory 330, storage component 340, input component 350, output component 360, communication interface 370, and/or the like) may cause an action to be performed to respond to the transaction volume anomaly, as described above in connection with FIGS. 1A-1E.

Process 600 may include additional implementations, such as any single implementation or any combination of implementations described below and/or in connection with one or more other processes described elsewhere herein.

In some implementations, the historical calendar data may include a plurality of day elements, where a day element, of the plurality of day elements, includes a plurality of time segments, date information, holiday information, or special event information. In some implementations, the transaction monitoring platform may receive a signal that indicates that the transaction volume anomaly was incorrect, and may retrain the machine learning model based on information stored by the storage device.

In some implementations, the transaction monitoring platform may cause, for each transaction type of the plurality of transaction types, display of the real-time data and the normal transaction volume range. In some implementations, when causing the action to be performed to respond to the transaction volume anomaly, the transaction monitoring platform may send the alert to a remote device, where sending the alert to the remote device causes the remote device to display an indicator that indicates that the transaction volume anomaly has occurred.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A server device, comprising:
one or more memories; and
one or more processors, communicatively coupled to the one or more memories, to:
  obtain historical transaction data regarding a plurality of transactions involving a network service;
  obtain historical calendar data regarding static date information for a historical time period that corresponds with the historical transaction data;
  train, by processing the historical transaction data and the historical calendar data, a machine learning model using a gradient boosting machine learning technique to predict a normal transaction volume for a period of time and generate one or more confidence bands associated with the normal transaction volume;
  predict the normal transaction volume for the period of time and generate the one or more confidence bands using the machine learning model;
  obtain real-time data concerning a transaction volume during the period of time;
  detect a transaction volume anomaly based on comparing the real-time data and the normal transaction volume and the one or more confidence bands;
  generate an alert based on the transaction volume anomaly;
  send the alert to a remote device to cause the remote device to display the alert and perform an action;
  determine, after detecting the transaction volume anomaly, that the transaction volume is normal based on the real-time data, the normal transaction volume, and the one or more confidence bands;
  determine a first point in time associated with detecting the transaction volume anomaly;
  determine a second point in time associated with determining that the transaction volume is normal;
  discard the real-time data associated with a time period between the first point in time and the second point in time; and
  update the machine learning model based on the real-time data that was not discarded.

2. The server device of claim 1, wherein the one or more processors, when predicting the normal transaction volume for the period of time and generating the one or more confidence bands using the machine learning model, are to:
  determine the normal transaction volume using the machine learning model;
  determine an upper confidence band using the machine learning model,
    wherein the upper confidence band indicates a first transaction volume threshold that is greater than the normal transaction volume; and
  determine a lower confidence band using the machine learning model,
    wherein the lower confidence band indicates a second transaction volume threshold that is less than the normal transaction volume.

3. The server device of claim 2, wherein the one or more processors, when detecting the transaction volume anomaly based on comparing the real-time data and the normal transaction volume and the one or more confidence bands, are to:
  determine that the real-time data satisfies the first transaction volume threshold; or
  determine that the real-time data satisfies the second transaction volume threshold.

4. The server device of claim 1, wherein the one or more processors, when detecting the transaction volume anomaly based on comparing the real-time data and the normal transaction volume, and the one or more confidence bands, are to:
  determine that a difference between the transaction volume and the normal transaction volume satisfies a threshold associated with the one or more confidence bands.

5. The server device of claim 1, wherein the one or more processors are further to:
  process the real-time data and the transaction volume anomaly to retrain the machine learning model.

6. The server device of claim 1, wherein the one or more processors are further to:
  send the real-time data and the transaction volume anomaly to one or more servers for storage; and
  retrain the machine learning model based on information stored by the one or more servers.

7. The server device of claim 1, wherein the action includes:
  a code rollback action;
  a server reset action;
  a server optimization action;
  a server recovery action; or
  a server logging action.

8. The server device of claim 1, wherein the one or more processors are further to:
  cause the remote device to display the real-time data, the normal transaction volume, and the one or more confidence bands.

9. The server device of claim 1, wherein the one or more processors, when causing the remote device to perform the action, are to:
  cause the remote device to perform a code rollback action;
  cause the remote device to perform a server reset action;
  cause the remote device to perform a server optimization action;
  cause the remote device to perform a server recovery action; or cause the remote device to perform a server logging action.

10. A non-transitory computer-readable medium storing instructions, the instructions comprising:
one or more instructions that, when executed by one or more processors of a server device, cause the one or more processors to:
obtain historical transaction data regarding a plurality of transactions involving a network service;
obtain historical calendar data regarding static date information for a historical time period that corresponds with the historical transaction data;
train, by processing the historical transaction data and the historical calendar data using a gradient boosting machine learning technique, a machine learning model to forecast a normal transaction volume for a period of time and a confidence band associated with the normal transaction volume;
forecast the normal transaction volume for the period of time and the confidence band using the machine learning model;
obtain real-time data concerning a transaction volume for the period of time;
detect a transaction volume anomaly based on comparing the real-time data and the confidence band;
generate an alert based on the transaction volume anomaly;
send the real-time data, the normal transaction volume, the confidence band, and the alert to a storage device;
cause an action to be performed to respond to the transaction volume anomaly;
determine, after detecting the transaction volume anomaly, that the transaction volume is normal based on the real-time data, the normal transaction volume, and the confidence band;
determine a first point in time associated with detecting the transaction volume anomaly;
determine a second point in time associated with determining that the transaction volume is normal;
discard the real-time data associated with a time period between the first point in time and the second point in time; and
update the machine learning model based on the real-time data that was not discarded.

11. The non-transitory computer-readable medium of claim 10, wherein the one or more instructions, when executed by the one or more processors, further cause the one or more processors to:
process the real-time data and the transaction volume anomaly using the gradient boosting machine learning technique to retrain the machine learning model.

12. The non-transitory computer-readable medium of claim 10, wherein the one or more instructions, that cause the one or more processors to obtain the real-time data concerning the transaction volume, cause the one or more processors to:
obtain real-time information from a plurality of server devices; and
obtain, by processing the real-time information, the real-time data for the period of time.

13. The non-transitory computer-readable medium of claim 10, wherein the one or more instructions, that cause the one or more processors to detect the transaction volume anomaly based on comparing the real-time data and the confidence band, cause the one or more processors to:
determine that the real-time data is outside of the confidence band for the period of time.

14. The non-transitory computer-readable medium of claim 10, wherein the alert indicates the transaction volume anomaly, a type of the transaction volume anomaly, a date of the transaction volume anomaly, and the period of time.

15. The non-transitory computer-readable medium of claim 10, wherein the one or more instructions, that cause the one or more processors to cause the action to be performed to respond to the transaction volume anomaly, cause the one or more processors to:
perform a code rollback action;
perform a server reset action;
perform a server optimization action;
perform a server recovery action; or
perform a server logging action.

16. A method, comprising:
obtaining, by a server device, historical transaction data regarding a plurality of transactions involving a network service,
wherein the historical transaction data concerns a plurality of transaction types;
obtaining, by the server device, historical calendar data regarding static date information for a historical time period that corresponds with the historical transaction data;
training, by the server device and by processing the historical transaction data and the historical calendar data using a gradient boosting machine learning technique, a machine learning model to predict a normal transaction volume for a period of time and generate one or more confidence bands associated with the normal transaction volume;
generating, by the server device and using the machine learning model, the normal transaction volume for the period of time and the one or more confidence bands;
obtaining, by the server device, real-time data concerning a transaction volume during the period of time;
detecting, by the server device, a transaction volume anomaly based on comparing the real-time data and the normal transaction volume and the one or more confidence bands;
generating, by the server device, an alert based on the transaction volume anomaly;
sending, by the server device, the real-time data, the normal transaction volume, and the alert to a storage device;
causing, by the server device, an action to be performed to respond to the transaction volume anomaly;
determining, by the server device and after detecting the transaction volume anomaly, that the transaction volume is normal based on the real-time data, the normal transaction volume, and the one or more confidence bands;
determining, by the server device, a first point in time associated with detecting the transaction volume anomaly;
determining, by the server device, a second point in time associated with determining that the transaction volume is normal;
discarding, by the server device, the real-time data associated with a time period between the first point in time and the second point in time; and
updating, by the server device, the machine learning model based on the real-time data that was not discarded.

17. The method of claim 16, wherein the historical calendar data comprises a plurality of day elements, wherein a day element, of the plurality of day elements, includes:
a plurality of time segments;
date information;
holiday information; or
special event information.

18. The method of claim 16, further comprising:
receiving a signal,
wherein the signal indicates that the transaction volume anomaly was incorrect; and
retraining the machine learning model based on information stored by the storage device.

19. The method of claim 16, further comprising:
causing, for each transaction type of a plurality of transaction types, display of the real-time data and the normal transaction volume.

20. The method of claim 16, wherein causing the action to be performed to respond to the transaction volume anomaly comprises:
sending the alert to a remote device,
wherein sending the alert to the remote device causes the remote device to display an indicator that indicates that the transaction volume anomaly has occurred.

\* \* \* \* \*